Figure 1:
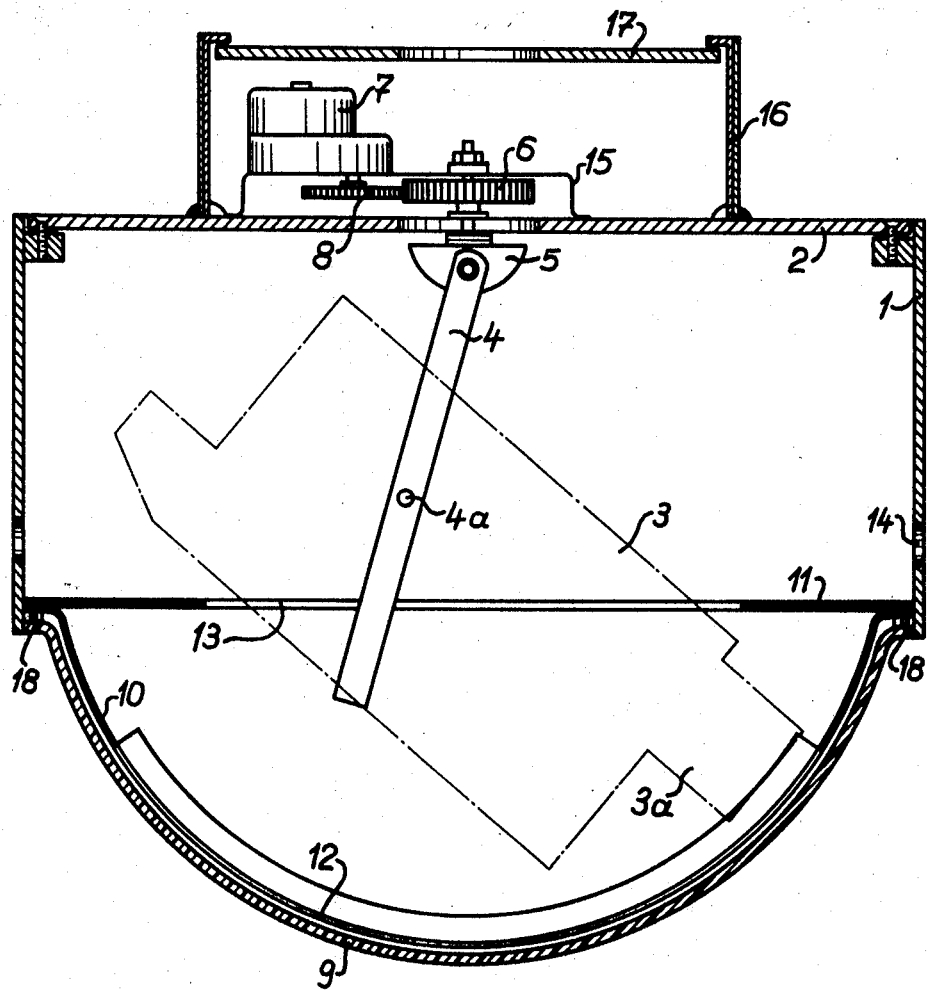

United States Patent [19]
Behles

[11] 3,739,703
[45] June 19, 1973

[54] CONCEALMENT OF CAMERAS FOR OBSERVATIONAL PURPOSES

[76] Inventor: Guy Behles, 9, rue Madame de Stael, 1201 Geneva, Switzerland

[22] Filed: Mar. 8, 1971

[21] Appl. No.: 122,112

[30] Foreign Application Priority Data
Mar. 9, 1970 Switzerland.................. 3285/70

[52] U.S. Cl. ............................................. 95/15
[51] Int. Cl. ......................................... G03b 37/02
[58] Field of Search............................ 95/15, 82, 86

[56] References Cited
UNITED STATES PATENTS
2,085,432 6/1937 Kean........................................ 95/82

3,535,442 10/1970 Jennings ............................ 95/15 X

FOREIGN PATENTS OR APPLICATIONS
212,168 11/1960 Austria ................................ 95/86

Primary Examiner—John M. Horan
Attorney—Robert E. Burns and Emmanuel J. Lobato

[57] ABSTRACT

A camera for observing a selected area is concealed by a hollow dome-like member partially metallised to form a convex mirror from the point of view of an observer in the selected area, whilst allowing light to pass through the member from the area to the camera.

3 Claims, 2 Drawing Figures

3,739,703

CONCEALMENT OF CAMERAS FOR OBSERVATIONAL PURPOSES

This invention relates to devices for observing an area to be controlled, for example the sales-counters in large stores, and is particularly, but not exclusively, concerned with deterrent security systems of this type.

It is already known in large stores to use planar one-way mirrors through which a member of the personnel can observe shoppers whilst remaining unseen by the latter. This system has been used with some success to catch thieves, but has not proven to be an effective deterrent.

It has also been proposed to employ multi-lens ceiling units in plain view, with a concealed closed-circuit television system to enable scanning of a whole sales area. This system is effective as a deterrent, but has three notable drawbacks. Firstly, the multi-lens ceiling units are relatively expensive. Secondly, since the ceiling units must be mass-produced, the angular dispositions of the lenses is fixed and this can mean that the installation does not give a satisfactory overall view of all parts of certain awkwardly shaped sales areas, so that "blind spots" may be left. Finally, whilst the protruding lenses may be effective in reminding customers that they are being watched, it would often be preferable to do this in a more discreet manner.

It is an aim of the invention to provide an observation system which overcomes these drawbacks.

According to a main aspect of the invention, a device for observing a selected area comprises a camera mounted to have a field of view in said area, and a hollow generally dome shaped member between the camera and the area, the dome shaped member being partially reflective so as to form a convex mirror from the point of view of an observer in the area and thereby conceal the camera from the view of such an observer, whilst allowing light to pass through the member from the area to the camera to provide an image of the area for operation of the camera.

The camera is advantageously a television camera forming part of a closed circuit television system, but could alternatively be a movie camera or a photographic camera depending upon the use to which the device is to be put.

Figure 2:
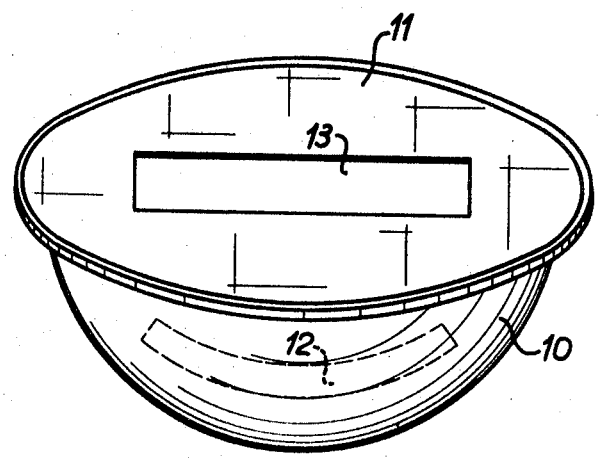

The invention will now be described, by way of example, with reference to the accompanying drawings, in which:

FIG. 1 is an axial cross-section through a device according to the invention; and FIG. 2 is a perspective view of a part of the device of FIG. 1.

The device shown comprises a hollow cylindrical body 1 in opaque material, having a base 2 which serves as a support for a television camera 3 forming part of a closed circuit television system (not shown). The camera 3 is pivotally mounted at 4a on a stirrup piece 4 pivotally fixed on a plate 5 which is mounted on a rotatable shaft of a toothed wheel 6. Means, such as a lock nut (not shown), are provided for angularly locking the stirrup piece 4 on the plate 5 in a chosen angular position. The toothed wheel 6 can be rotatably driven by means of an electric motor 7 driving a toothed wheel 8 in mesh with the wheel 6.

The motor 7 and toothed wheels 6 and 8 are mounted on a bracket 15 and are protected from dust by a housing formed by a wall 16 and cover 17. Suitable apertures, not shown, are provided for the passageway of electrical leads for the camera 3 and motor 7.

The device is mounted on a suitable support, such as a wall or ceiling, by any suitable means such as screws, nuts and bolts, cooperating with the wall 16, cover 17, and/or possibly the base 2. The device is appropriately placed on the support so that the camera 3 has a field of view in an area to be observed.

The body 1 is closed by a substantially hemispherical dome 9 in transparent glass or plastics material. The inner surface of the dome 9 is metallised so as to reflect a proportion of light rays impinging on the dome 9 from outside, whilst allowing a proportion of these light rays to pass through the dome 9. Hence, for an observer in the area to be observed the dome appears to be a hemispherical convex mirror, and the camera 3 is concealed. However, some light passes through the dome 9 where it is received by an objective 3a of the camera, so that the camera receives an image of the area to be observed.

In order to make the mirror highly reflective, and hence effectively conceal the camera from an observer looking from any angle, whilst allowing sufficient light to pass through the dome 9 to allow operation of the device in poorly lit zones, an opaque mask 10, FIG. 2, is provided. The mask 10 is formed of a substantially hemispherical member closed by a plate 11. The mask 10 has a slot 12 in alignment with the objective 3a of the camera 3, whilst the plate 11 has a rectangular aperture 13 to accommodate the camera body.

The peripheral edge of the plate 11 and mask 10 are freely rotatably mounted in relation to the body 1 and dome 9 by means of a roller bearing 18. Consequently, when the camera 3 is turned by means of motor 7, the mask 10 turns with the camera and the objective 3a remains in alignment with the slot 12. Means, not shown, can be provided for automatically altering the angular inclination of the camera 3 about the pivot point 4a so that the camera can scan a relatively large area.

Openings 14 may be provided in the body 1 for the fixation of flashing lights to draw the attention of an observer to the device, if required.

The described device can, for example, be incorporated in a security system to detect and deter theft in large stores. Such a system can comprise a plurality of devices as described each positioned to enable scanning of a separate area. Movement of the cameras and observation of the transmitted image is carried out at a central monitoring station. Clients may be rendered attentive to such a security system by suitable notices and, for example, by a monitor television set upon which transmitted images are seen.

The clients therefore see the reflecting domes which give a distorted image, similar to the image obtained with a fish-eye lens. It has been observed that these reflecting domes have an important psychological effect upon observers. The informed observer, and especially the would-be thief, has an impression, from the distorted image on the dome, that the whole area adjacent the dome is being scanned. However, it is of course impossible for the observer to know whether a hidden camera covers the whole area; or in which direction the camera is pointing; or even whether there is a camera at all.

For economy reasons, such a deterrent system may therefore incorporate one or more devices as described and a plurality of dummy devices. The dummy devices have the same outward appearance as a live device, but do not incorporate a camera and the associated mechanism. Consequently an effective deterrent system can be provided at low cost.

For the uninformed observer, who is not aware that the domes conceal a scanning system, the outward appearance of the reflecting domes gives no undesirable psychological reaction that the person is being watched. Thus, for the majority of shoppers who have no intention of stealing, the presence of the domes is not unpleasant; on the contrary, the would-be thief's attention is drawn to the domes, and this forms an effective deterrent.

Furthermore, devices according to the invention can be used for other purposes, such as observing patients in a hospital ward, where the presence of a visible camera or the known system with protruding lenses could be undesirable.

Many modifications to the described device are possible without departing from the scope of the appended claims. Two or more cameras each covering a distinct field can be incorporated in one device. It is also possible to provide other masking means having a different shape, or provided with partitions, for example.

What is claimed is:

1. A device for observing a selected area comprising, a camera mounted to have a field of view in a given area, a generally dome-shaped hollow member between the camera and said area, the dome-shaped member comprising partially reflective means comprising an inner metallized surface on said dome-shaped member and an opaque screen adjacent said inner surface said opaque screen having an aperture to allow passage of light through the member from said given area to the camera thereby defining a convex mirror from externally thereof to conceal the camera from the view of an observer while allowing light to pass through the member from exteriorly thereof to the camera to provide in operation an image of an area viewed by the camera, means mounting said camera, means for moving said camera and means mounting said screen for cooperation with said camera.

2. A device according to claim 1, in which said means mounting the camera and screen comprise means for moving the camera and screen about an axis passing substantially through the center of the dome-shaped member and through the apex of the dome-shaped member.

3. A device according to claim 2, in which said camera comprises an objective and in which said aperture in the screen is a longitudinal slot and in which said means mounting said camera mount the camera pivotally for movement so that said objective thereof can be moved along said slot.

* * * * *